United States Patent
Ritter et al.

(10) Patent No.: US 10,138,621 B2
(45) Date of Patent: Nov. 27, 2018

(54) HANDLE ASSEMBLY

(71) Applicant: Kohler Co., Kohler, WI (US)

(72) Inventors: David H. Ritter, Kohler, WI (US); Brian S. Core, Fond du Lac, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 15/414,770

(22) Filed: Jan. 25, 2017

(65) Prior Publication Data

US 2017/0211260 A1 Jul. 27, 2017

Related U.S. Application Data

(60) Provisional application No. 62/287,217, filed on Jan. 26, 2016.

(51) Int. Cl.
*E03C 1/04* (2006.01)
*F16K 11/22* (2006.01)
*F16K 31/60* (2006.01)

(52) U.S. Cl.
CPC ............ *E03C 1/0412* (2013.01); *F16K 11/22* (2013.01); *F16K 31/602* (2013.01); *Y10T 137/598* (2015.04)

(58) Field of Classification Search
CPC ...... E03C 1/0412; F16K 11/22; F16K 31/602; Y10T 137/598
See application file for complete search history.

(56) References Cited

U.S. PATENT DOCUMENTS

| | | | |
|---|---|---|---|
| 4,306,468 A | 12/1981 | Bolgert | |
| 4,559,966 A * | 12/1985 | Massey | F16K 31/602 137/270 |
| 4,593,430 A | 6/1986 | Spangler et al. | |
| 6,279,604 B1 * | 8/2001 | Korb | E03C 1/04 137/359 |
| 7,540,300 B2 * | 6/2009 | Thomas | E03C 1/04 137/359 |
| 7,987,869 B2 * | 8/2011 | Rosko | F16K 3/085 137/315.15 |
| 8,074,675 B2 * | 12/2011 | Thomas | E03C 1/04 137/359 |
| 8,074,893 B2 * | 12/2011 | Mace | G05D 23/1353 236/12.11 |
| 9,062,796 B2 * | 6/2015 | Horsman | F16K 31/602 |
| 9,151,405 B2 * | 10/2015 | Marotz | F16K 31/602 |

(Continued)

FOREIGN PATENT DOCUMENTS

| | | |
|---|---|---|
| CN | 101946046 | 1/2011 |
| CN | 201916512 | 8/2011 |

(Continued)

*Primary Examiner* — Craig Schneider
*Assistant Examiner* — Kevin Barss
(74) *Attorney, Agent, or Firm* — Foley & Lardner LLP

(57) ABSTRACT

A faucet handle assembly includes a faucet handle, a handle adaptor, and a bonnet. The handle adaptor includes a plurality of end stops extending radially outward therefrom, and is configured to rotatably couple the faucet handle to a fluid control valve disposed within a valve body, and rotatably couple to the valve body by the plurality of end stops. The bonnet includes an inner ring having a plurality of locking features, and is configured to be removably coupled to the valve body by the plurality of locking features.

20 Claims, 14 Drawing Sheets

(56) References Cited

U.S. PATENT DOCUMENTS

| | | | |
|---|---|---|---|
| 2004/0182459 A1* | 9/2004 | Klein | E03C 1/04 137/801 |
| 2005/0241701 A1 | 11/2005 | Bender | |
| 2010/0147407 A1 | 6/2010 | Rosko et al. | |
| 2010/0200077 A1 | 8/2010 | Chan et al. | |
| 2011/0073205 A1* | 3/2011 | Marty | E03C 1/0403 137/801 |
| 2012/0273075 A1 | 11/2012 | Pitsch et al. | |
| 2013/0042925 A1 | 2/2013 | Ritter et al. | |
| 2013/0220439 A1 | 8/2013 | Pitsch et al. | |
| 2015/0152975 A1* | 6/2015 | Jonte | E03C 1/0412 251/208 |
| 2016/0265201 A1* | 9/2016 | Hoogendoorn | F16K 31/605 |

FOREIGN PATENT DOCUMENTS

| | | |
|---|---|---|
| CN | 204690849 | 10/2015 |
| DE | 19700331 | 7/1998 |
| DE | 10239175 | 3/2004 |
| GB | 1 142 389 | 2/1969 |
| JP | 2006329304 | 12/2006 |

\* cited by examiner

HANDLE ASSEMBLY

CROSS-REFERENCE TO RELATED PATENT APPLICATIONS

This application claims the benefit of and priority to U.S. Provisional Application No. 62/287,217, filed Jan. 26, 2016, the entire disclosure of which is hereby incorporated by reference herein.

BACKGROUND

The present application relates generally to faucets, and in particular, to handle adapters and handle bonnets for use in faucets, such as widespread or centerset faucets.

Generally speaking, faucet assemblies, such as widespread and centerset faucet assemblies, typically include two separate valve bodies associated with a hot water source and a cold water source, respectively. The valve bodies can hold a valve, such as a fluid mixing valve, to control the amount of water delivered to a user from the two water sources. One water source may be termed hot, and the other cold, depending on the temperature of the water sources. A handle assembly can be removably coupled to each of the valves to allow a user to control the temperature and flow rate of a flow of water exiting the faucet assembly. The separate valve bodies can be joined together by a connecting member, sometimes referred to as a waterway connector, which can facilitate mixing of hot and cold water from the different water sources. A spout or fluid conduit can extend from the waterway to deliver mixed water to a user. The handle assemblies may include a bonnet (e.g., a cover, a shroud, etc.) connected to a handle adaptor and/or a yoke (e.g., a valve body, etc.) through the use of a threaded interface. Typically, the bonnet is configured to conceal the portion of the body of the faucet and the handle adapter that protrudes up from the installation surface from the view of a user (e.g., on a countertop, a wall, etc.).

In addition, many of the valves used in typical faucet assemblies, such as widespread and centerset faucet assemblies, incorporate a stop feature or mechanism to establish the end point of valve rotation. For example, the rotation of the individual valves may be mechanically limited by a structural feature integrated within the valves. Limiting the rotation of the valves prevents a user from operating the valves outside of their intended operating range and causing damage to the valves.

SUMMARY

One embodiment relates to a faucet handle assembly. The faucet handle assembly includes a faucet handle, a handle adaptor, and a bonnet. The handle adaptor includes a plurality of end stops extending radially outward therefrom, and is configured to rotatably couple the faucet handle to a fluid control valve disposed within a valve body, and rotatably couple to the valve body by the plurality of end stops. The bonnet includes an inner ring having a plurality of locking features, and is configured to be removably coupled to the valve body by the plurality of locking features.

Another embodiment relates to a faucet handle assembly including a faucet handle, a handle adaptor, and a bonnet. The handle adaptor is coupled to the handle. The handle adaptor includes a plurality of end stops extending radially outward therefrom and a torsion ring disposed around the handle adaptor. The handle adaptor is configured to rotatably couple the faucet handle to a fluid control valve disposed within a valve body, and rotatably couple to the valve body by the plurality of end stops. The bonnet includes an inner ring having a plurality of locking features, and is configured to be removably coupled to the valve body by the plurality of locking features. The handle and the handle adaptor are configured to rotate relative to the valve body and the torsion ring is configured to engage the valve body to provide frictional resistance therebetween.

Another embodiment relates to a faucet handle assembly including a faucet handle, a handle adaptor, and a bonnet. The handle adaptor is coupled to the faucet handle and is configured to rotatably couple the faucet handle to a fluid control valve disposed within a valve body, and rotatably couple to the valve body. The bonnet includes an inner ring having a plurality of locking features, and is configured to be removably coupled to the valve body by the plurality of locking features. The inner ring of the bonnet extends radially inward toward a center of the bonnet, and the plurality of locking features extend radially further inward toward the center of the bonnet from the inner ring.

It is to be understood that both the foregoing general description and the following detailed description are exemplary and explanatory only, and are not restrictive of the invention as claimed.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
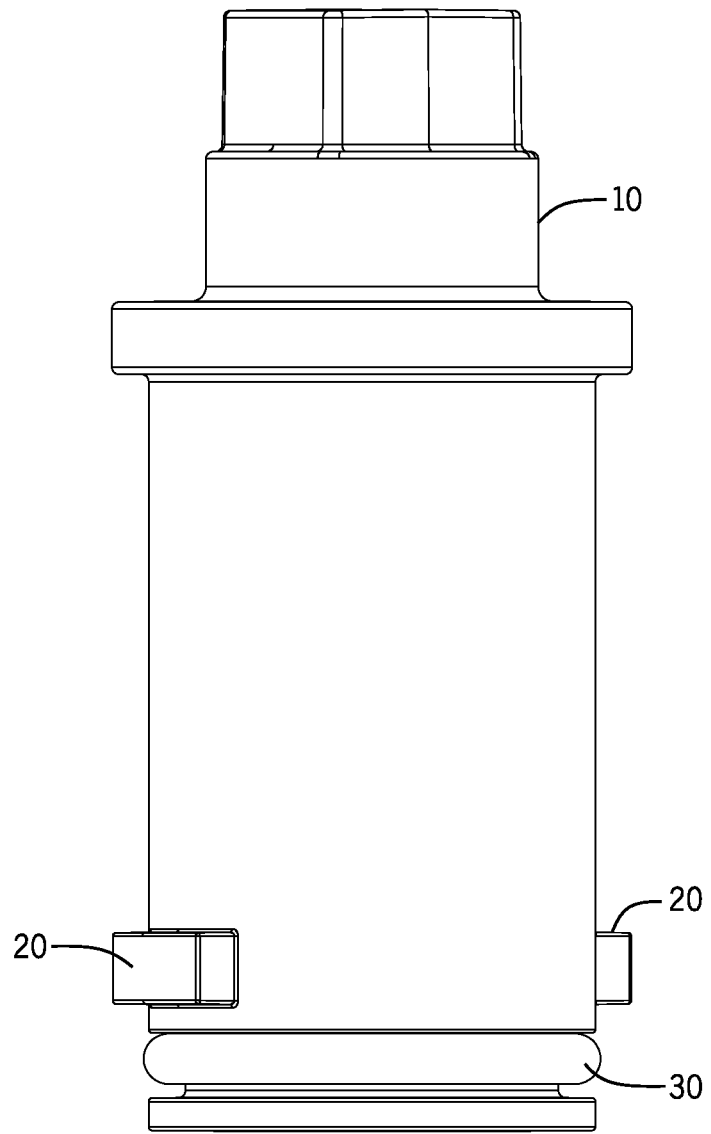
FIG. 1 is a perspective view of a handle adaptor for a faucet assembly, according to an exemplary embodiment of the present disclosure.
Figure 2:
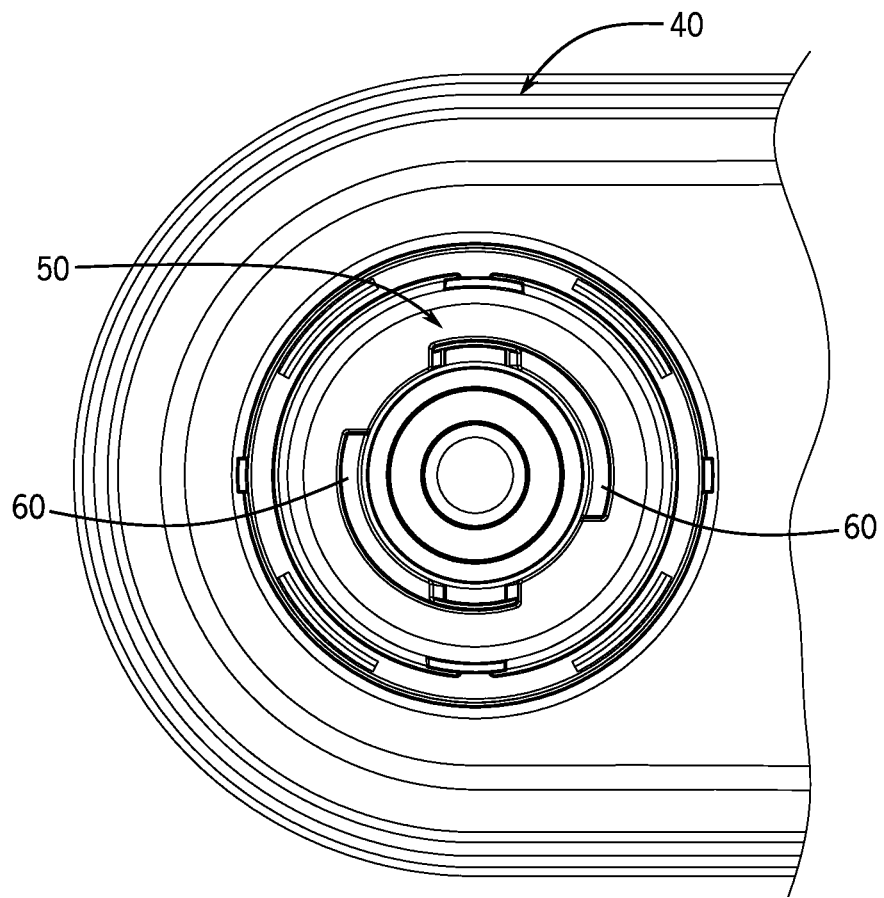
FIG. 2 is a top view of a valve body of a faucet assembly for use with a handle adaptor, such as that shown in FIG. 1, according to an exemplary embodiment of the present disclosure.

Referring to FIGS. 1 and 2, a handle adaptor 10 for use within a faucet assembly is shown, according to an exemplary embodiment. Handle adaptor 10 includes a plurality of end stops 20 and a torsion ring 30. Handle adaptor 10 is configured to be rotatably coupled to a valve body or "yoke," and to rotatably couple the motion of a faucet handle to the motion of a valve stem on a fluid control valve, such as a mixing valve. That is to say, the handle adaptor 10 can be coupled to a handle at one end and to a valve stem of a fluid control valve at an opposite end. In application, a user may manipulate the handle of the faucet assembly (e.g., rotate, etc.) in order to adjust the water flow from the fluid control valve of the faucet assembly.

In a traditional faucet assembly, the motion of the valve assembly, and therefore the travel of the handle, is limited by internal mechanisms or features within the valve assembly. In contrast, handle adaptor 10, according to an exemplary embodiment, includes integrated end stops 20 (e.g., teeth, prongs, protrusions, protuberances, tangs, nubs, etc.) that are configured to mate or be received within corresponding end stop receiving channels 60 (e.g., slots, grooves, rails, rings, passages, etc.) in a yoke 90 (e.g., valve body, body, etc.) of the faucet assembly. Yoke 50 is configured to fit within a bonnet 40 (e.g., cover, shroud, etc.), which can provide a structural shell for a portion of the faucet assembly. According to an exemplary embodiment, faucet handle adaptor 10 includes two end stops 20, which are coplanar, disposed approximately one-hundred and eighty degrees apart (i.e., diametrically opposed), and where each have an angular travel of approximately ninety degrees. In typical valve assemblies, an angular travel of approximately ninety degrees fully articulates the valve assembly from an open position to a closed position, and vice versa.

Handle adaptor 10 may further include torsion ring 30 disposed circumferentially within a groove included within handle adaptor 10. According to the exemplary embodiment shown, the torsion ring 30 is disposed along a lower portion of the handle adaptor 10. The groove is sized to appropriately receive torsion ring 30 therein, and may be sized to include a specified amount of relative play (e.g., movement, spacing, etc.) between torsion ring 30 and handle adaptor 10. According to an exemplary embodiment, torsion ring 30 may be an o-ring (e.g., packing, toric joint, gasket, spacer, loop, seal, etc.) which may be constructed out of any suitable material including, for example, nitrile, Buna-N nitrile, nitrile butadiene rubber (NBR), perfluoroelastomer (FFKM), vinylidene fluoride and hexafluoropropylene (Viton®), fluoroelastomer (FKM), fluorocarbon, silicone, tetrafluoroethylene (TFE), Neoprene®, fluorinated ethylene propylene (FEP), polytetrafluoroethylene (PTFE) (Teflon®), perfluoroalkoxy alkane (PFA), and other suitable materials or combinations of materials.

Torsion ring 30 can provide a particular amount of torsional resistance to the user when the handle is articulated, such that the user experiences a desired level of tactile feedback. This torsional resistance is provided through the added frictional force created during rotation of the handle assembly between yoke 50 and handle adaptor 10, which is transferred through torsion ring 30. In order to specify the amount of torsional resistance provided to the user, torsion ring 30, and the corresponding groove on handle adaptor 10, may be sized larger, smaller, thicker, or thinner, depending on a particular application. In addition, torsion ring 30 may be made of a different material in order to provide a desired resistance or tactile response. Further, torsion ring 30 or handle adaptor 10 may be textured or have other geometric features (e.g., knurling, etching, etc.) to provide additional torsional resistance or tactile response. According to an exemplary embodiment, the groove and torsion ring 30 are positioned at the end of handle adaptor 10 nearest the valve assembly, and disposed circumferentially around handle adaptor 10. According to other exemplary embodiments, the groove and torsion ring 30 are disposed at other circumferential locations on handle adaptor 10. For example, for some configurations of yoke 50 it may be desirable to locate torsion ring 30 in the middle portion of handle adaptor 10 or at the handle end of handle adaptor 10 (i.e., nearest the handle when coupled to the handle adaptor 10).

According to an exemplary embodiment, handle adaptor 10 includes two end stops 20 extending radially outward from a side portion of the handle adaptor 10. However, according to other exemplary embodiments, handle adaptor 10 may include only one end stop 20, or may include three, four, or more end stops 20. In some embodiments, end stops 20 are disposed on different planes and on other locations of handle adaptor 10. For example, one end stop 20 may be positioned proximate the valve assembly side of handle adaptor 10 while another end stop 20 may be positioned within the middle portion of handle adaptor 10. According to an exemplary embodiment, end stops 20 are disposed one-hundred and eighty degrees apart on handle adaptor 10 (i.e., diametrically opposed). According to other embodiments, other angular spacing configurations are possible. For example, end stops 20 may be disposed forty-five degrees apart or ninety degrees apart.

According to various embodiments, the angular travel of end stops 20 can be increased or decreased depending on valve assembly configurations and the needs of the user. Increasing or decreasing the angular travel of end stops 20 correspondingly increases or decreases the travel of the handle, which may be manipulated by the user. In some applications, it may desirable for the handles of a faucet assembly to require less rotational travel to achieve a desired output of the valve assembly. For example, decreasing the overall angular travel may impose an intentionally designed limit on the output of the valve assembly. According to various embodiments, different valve assemblies are utilized in the faucet that have different angular travels required to fully articulate. According to these embodiments, end stop receiving channels 60 within yoke 50 have angular travels that are sized to permit the full range of motion of the valve assembly via manipulation of the handle by the user. According to various embodiments, end stop receiving channels 60 have an angular travel less than approximately ninety degrees and have an angular travel of, for example, seventy-five degrees, sixty degrees, forty-five degrees, thirty degrees, or other suitable angular travels. According to other various embodiments, end stop receiving channels 60 have an angular travel greater than approximately ninety degrees and have an angular travel of, for example, one-hundred and eighty degrees, one-hundred and thirty-five degrees, one-hundred and twenty degrees, one-hundred degrees, or other suitable angular travels. In an embodiment, handle adaptor 10 includes only one end stop 20 and end stop receiving channel 60 permits an angular travel of any suitable distance.

According to an exemplary embodiment, the profiles of end stop 20 and end stop receiving channel 60 are complementary to each other such that the end stop 20 is received within or mated to end stop receiving channel 60. According to an exemplary embodiment, the profiles of end stop 20 and end stop receiving channel 60 are configured to be substantially rectangular in shape. According to other exemplary embodiments, the profiles of end stop 20 and end stop receiving channel 60 are square, triangular, rounded, substantially semicircular, or have other suitable profiles or shapes. The profile of end stop 20 may be different than the profile of corresponding end stop receiving channel 60. For example, end stop 20 may have a square profile while end stop receiving channel 60 may have a rectangular profile. Further, according to various exemplary embodiments, the profiles of end stop 20 and end stop receiving channel 60 may be configured to incorporate a specified amount of play or relative movement between end stop 20 and end stop receiving channel 60.

According to an exemplary embodiment, the interface between end stops 20 and end stop receiving channels 60 is configured to provide torsional resistance to the rotation of handle adaptor 10. In order to increase the torsional resistance of the interface between end stops 20 and end stop receiving channels 60, different profiles, sizes, and combinations of end stops 20 and end stop receiving channels 60 may be employed. In some embodiments, handle adaptor 10 does not include torsion ring 30 because the torsional resistance provided by the interface of end stops 20 and end stop receiving channels 60 is sufficient for a desired application. The interface between end stops 20 and end stop receiving channels 60 may provide substantial torsional resistance in addition to the torsional resistance provided by torsion ring 30. Through the implementation of the added torsional resistance provided by the interface between end stops 20 and end stop receiving channels 60 the need for torsion ring 30 in handle adaptor 10 may be eliminated or supplemented.

Figure 3:
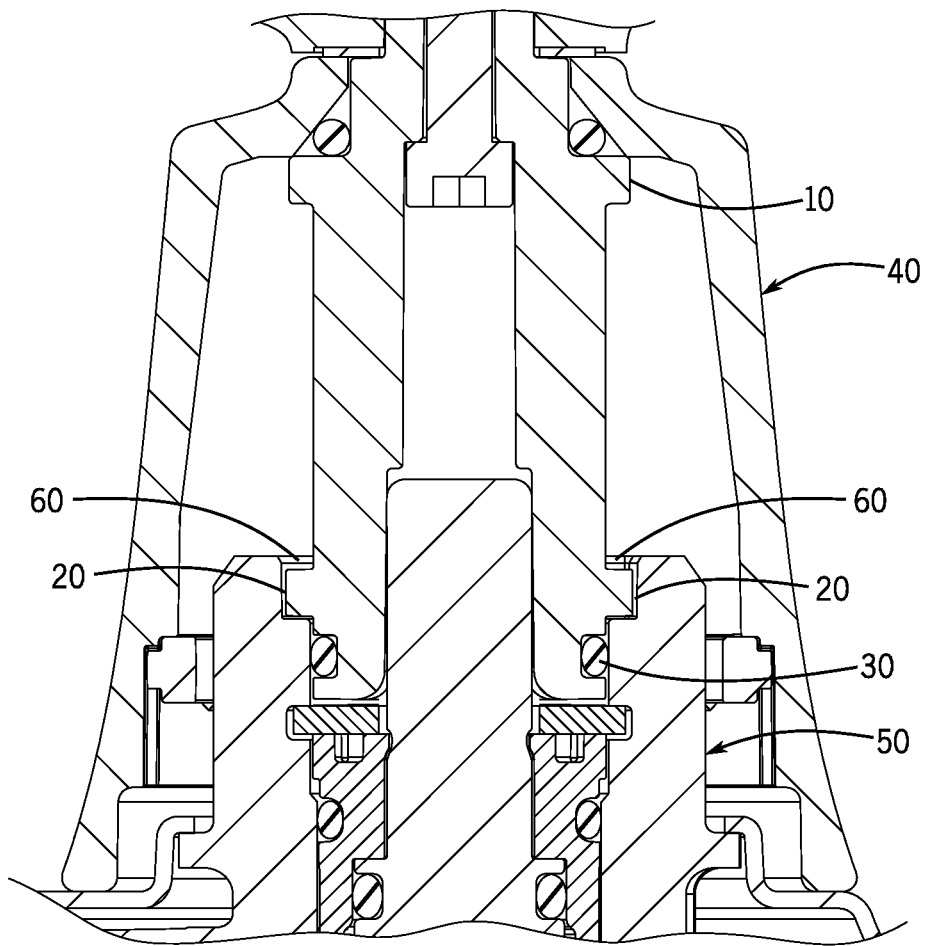
FIG. 3 is a cross-sectional view of a faucet assembly including a bonnet, a handle adaptor, a valve yoke, and a valve, according to an exemplary embodiment of the present disclosure.
Figure 4:
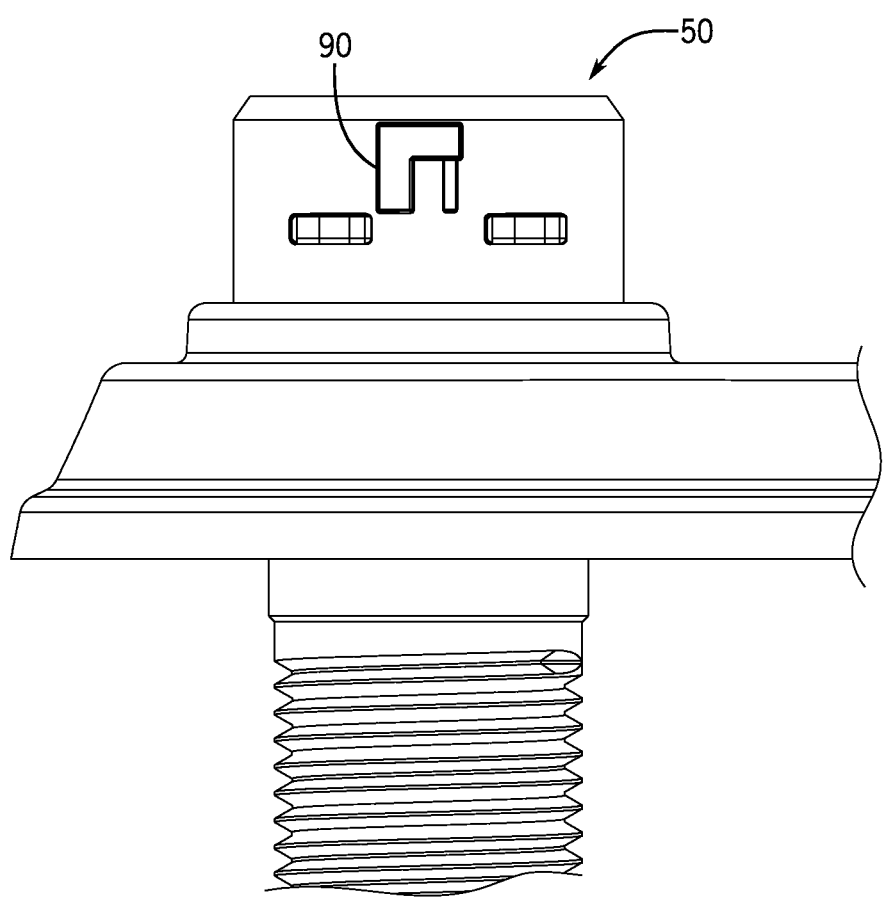
FIG. 4 is a front view of a yoke for a faucet assembly including a snap profile according to an exemplary embodiment of the present disclosure.
Figure 5:
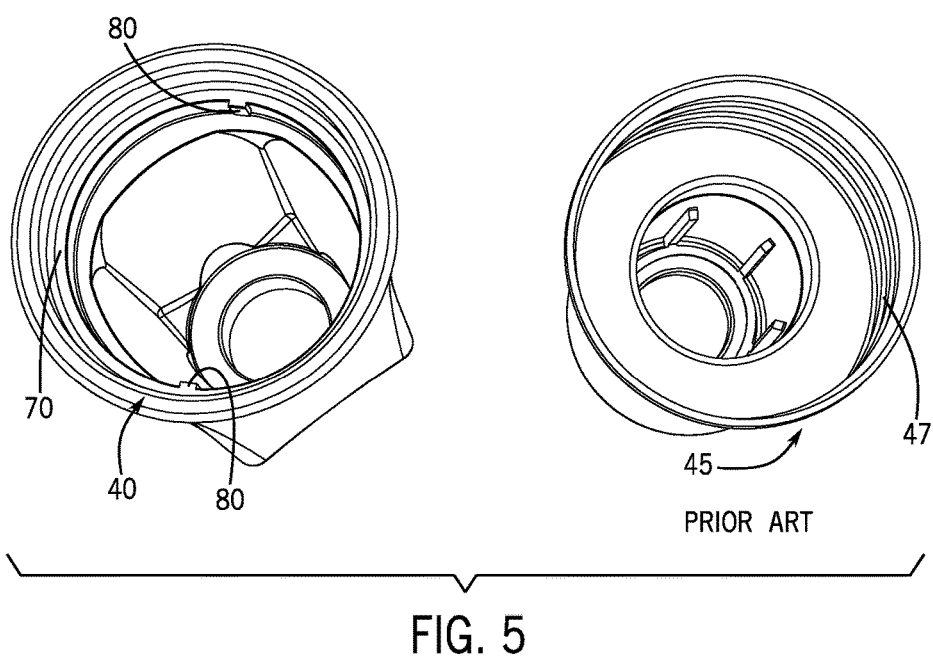
FIG. 5 is a perspective view of a bonnet with an inner ring and a plurality of locking features, according to an exemplary embodiment of the present disclosure, and a traditional bonnet including inner threads, according to the prior art.

Referring now to FIGS. 3-5, the interconnection of the aforementioned components is illustrated in a cross-sectional view of a portion of the faucet assembly. According to an exemplary embodiment, bonnet 40 can couple to yoke 50 via a locking mechanism. In one embodiment, the locking mechanism utilizes a down, turn-and-snap feature to locate, orientate, and snap into a profile, shown as mating snap profile 90, disposed on yoke 50. According to an exemplary embodiment, the locking mechanism includes a ring extending radially inward toward a center of the bonnet 40, shown as inner ring 70, with a plurality of locking features extending radially further inward toward the center of the bonnet 40 from the inner ring 70, shown as locking features 80. The locking features 80 can be received within or engage a corresponding snap profile 90 of yoke 50. In some embodiments, locking features 80 take on different shapes and profiles. In other embodiments, inner ring 70 does not have a constant diameter and instead has a ramped section where the width of inner ring 70 progressively increases to provide a progressively tighter fit with yoke 50. In some embodiments a plurality of inner rings 70 are included within bonnet 40 and/or other mechanisms for removably coupling bonnet 40 to yoke 50. FIG. 3 also illustrates the fitment of torsion ring 30 between handle adaptor 10 and yoke 50, according to an exemplary embodiment. As shown, a portion of torsion ring 30 is engaged with an inner wall of yoke 50, such that rotation of handle adaptor 10 will cause frictional resistance between the torsion ring 30 and the inner wall of yoke 50, thereby providing a tactile response to a user manipulating the handle of the faucet assembly (see, for example, FIGS. 6-9, 11, and 13-14). In this manner, the torsion ring 30 can provide a desired tactile response to a user of the faucet assembly.

Further, FIG. 3 illustrates the rectangular profiles of end stops 20 and end stop receiving channels 60, according to an exemplary embodiment. In order to provide for alternative embodiments, as discussed above in regards to utilizing a plurality of end stops 20, torsion rings 30, and/or end stop receiving channels 60, yoke 50 may need to extend further into bonnet 40 to provide additional space for the added component(s). In addition, the inclusion of torsion ring 30 in the faucet assembly allows for simple conversion of the faucet assembly from a surface mount application to a wall mount application. For example, in wall mount applications, torsion ring 30 may provide enough torsional resistance for the handle to remain in position without the handle being unintentionally rotated due to the effect of gravity.

FIG. 5 illustrates the differences between bonnet 40 and a traditional bonnet 45, shown according to the prior art. As previously explained, bonnet 40 includes both inner ring 70 and a plurality of locking features 80 disposed on inner ring 70, according to an exemplary embodiment. In contrast, traditional bonnet 45 includes inner threads 47 to provide for a theadable connection to yoke 50. By replacing inner threads 47 with inner ring 70 and locking features 80, bonnet 40 simplifies the assembly process and decreases manufacturing costs associated with the manufacturing of the faucet assembly. Inner ring 70 and locking features 80 may be integrally formed on bonnet 40 during formation of bonnet 40, or may be subsequently attached to bonnet 40 in a post-processing step. For example, inner ring 70 and locking features 80 may be attached to bonnet 40 by ultrasonic welding, according to an exemplary embodiment.

Figure 6:
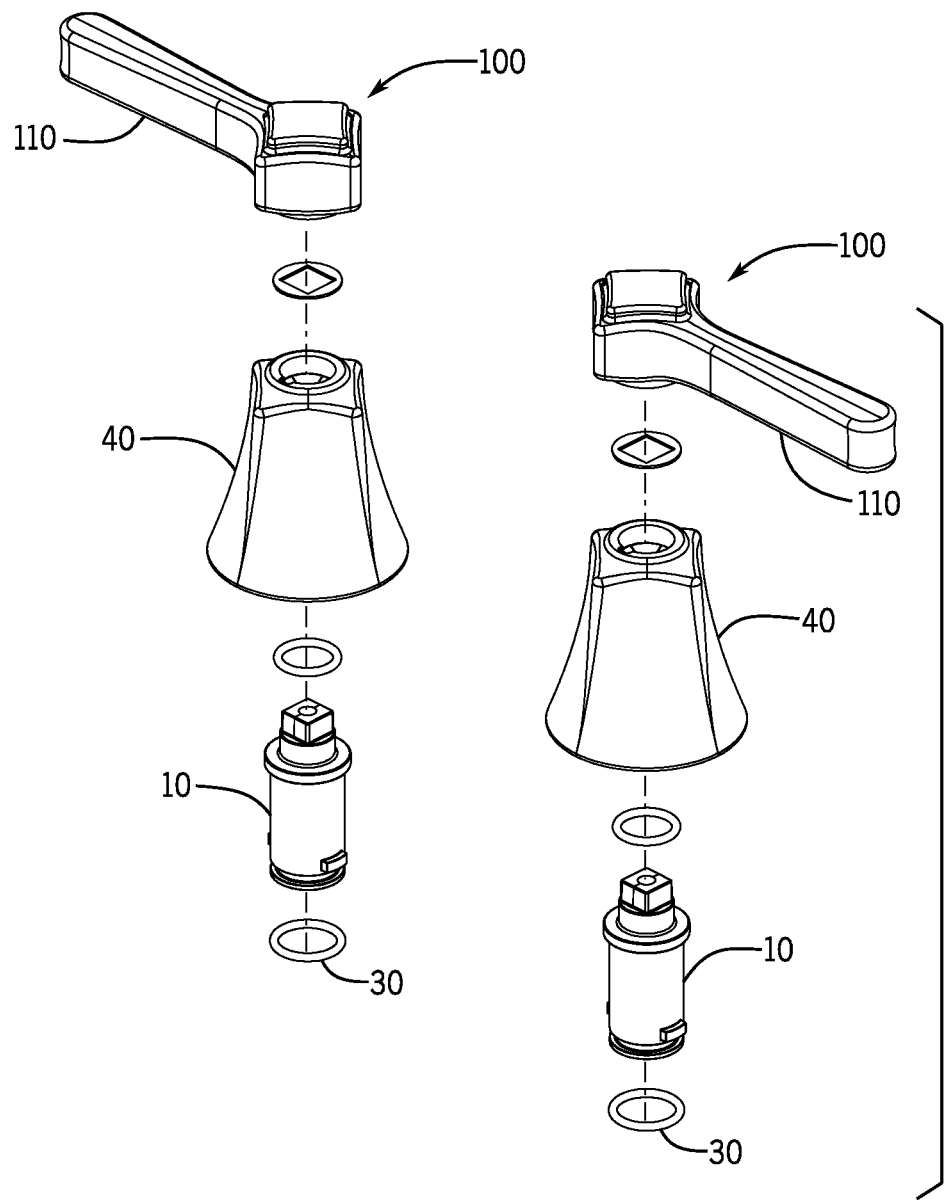
FIG. 6 is a perspective view of two handle assemblies, according to an exemplary embodiment of the present disclosure.
Figure 7:
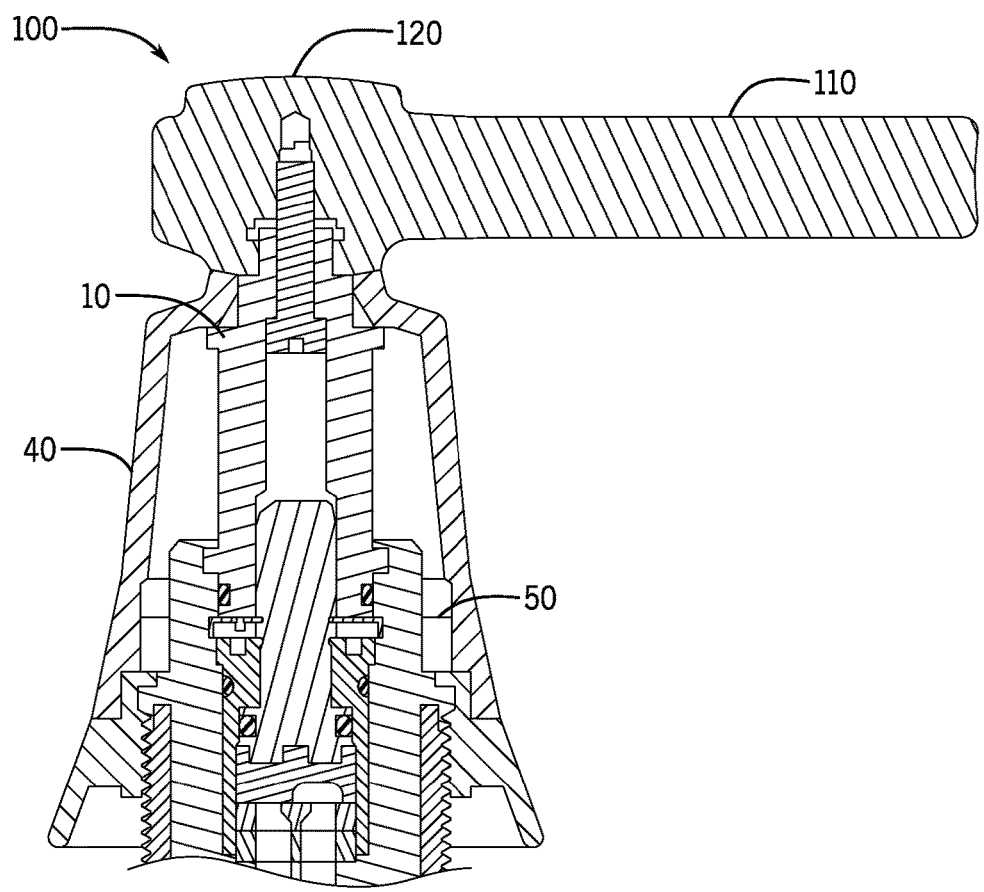
FIG. 7 is a cross-sectional view of a handle assembly including a handle, a profiled post, a bonnet, and a handle adaptor, according to an exemplary embodiment of the present disclosure.

Referring now to FIGS. 6-7, a handle assembly 100 is shown, which may be assembled without the use of fasteners according to an exemplary embodiment. Referring to FIG. 6, a perspective view of two handle assemblies is shown, according to an exemplary embodiment. As shown, handle assembly 100 includes handle 110, bonnet 40, handle adaptor 10, and various suitable hardware components (e.g., crush washers, washers, bushings, spacers, 0-rings, etc.). Referring to FIG. 7, handle assembly 110 is shown to include handle 110, bonnet 40, handle adaptor 10, yoke 50, and a post 120. According to an exemplary embodiment, handle 110 is cast with post 120. According to an exemplary embodiment, post 120 has a tapered profile to facilitate an interference fit between the post 120 and the handle adapter 10. For example, to couple handle 110 onto handle adaptor 10, post 120 may be pressed (e.g., inserted, press-fit, etc.) into an opening disposed within an upper portion of handle adaptor 10. According to various exemplary embodiments, handle assembly 100 is assembled without the use of fasteners, and instead through a press-fit (e.g., friction fit, etc.)

interaction between handle 110 and handle adaptor 10. Post 120 may be secured to handle adaptor 10 and handle 110 through various attachment mechanisms such as a threaded interface (i.e., through the use of threads), adhesive, or other suitable attachments. The shape and size of post 120 and handle adaptor 10 may be altered to provide different interfaces through the alterations of shape, size geometry, roughness, or other structural characteristics of post 120 and/or handle adaptor 10. According to an exemplary embodiment, handle 110 and post 120 are cast out of zinc. Handle assembly 100 may, advantageously, allow a user to install and remove handle 110 from handle assembly 100 without the use of special tools. As a result, handle assembly 100 may be serviced, replaced, or installed with more ease than convention handle assemblies, which often require the use of fasteners and/or special tools.

Figure 8:
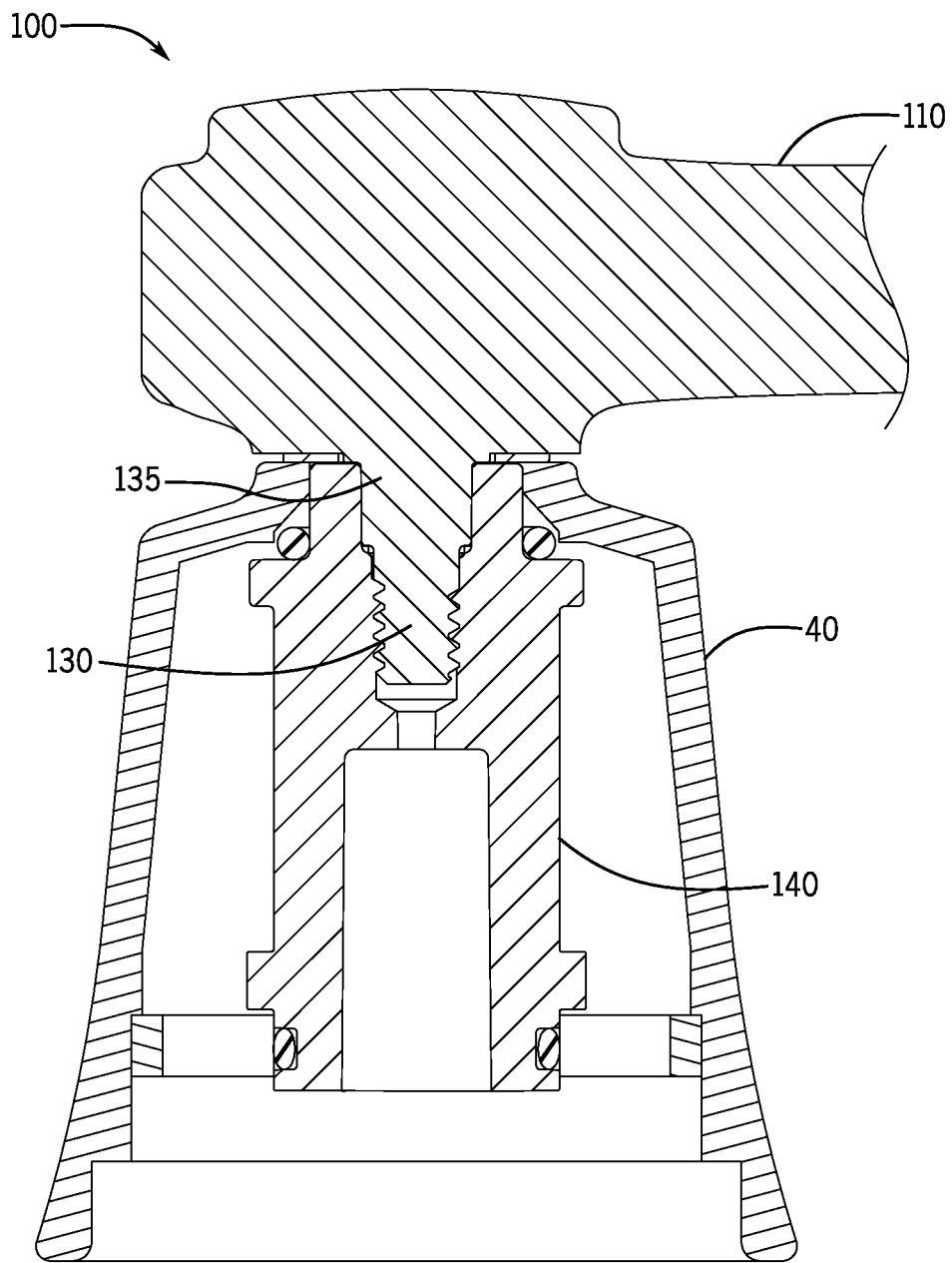
FIG. 8 is a cross-sectional view of a handle assembly including a threaded post including locking threads, a bonnet, and a handle adaptor, according to an exemplary embodiment of the present disclosure.

Referring to FIG. 8, handle assembly 100 may include handle 110, bonnet 40, a modified handle adaptor 140, and a threaded post 135, which may include locking threads 130. According to other exemplary embodiments, threaded post 135 includes a plurality of progressive circular ribs. The threaded post 135 extends downwardly from the handle 110, and may be integrally formed with handle 110. According to the exemplary embodiment shown, threaded post 135 is threadably coupled to modified handle adaptor 140 through the use of locking threads 130. In this embodiment, locking threads 130 cut into (e.g., turn into, thread into, interlock with, etc.) an inner wall of modified handle adaptor 140. According to an exemplary embodiment, modified handle adaptor 140 includes a threaded portion configured to receive threaded post 135. Adhesive may be optionally used to couple threaded post 135 to modified handle adaptor 140. Threaded post 135 may include various thread patterns and may optionally include other interlocking patterns such as teeth, protuberances, protrusions, and other suitable interlocking patterns configured to couple handle 110 to modified handle adaptor 140 in an axial position.

Figure 9:
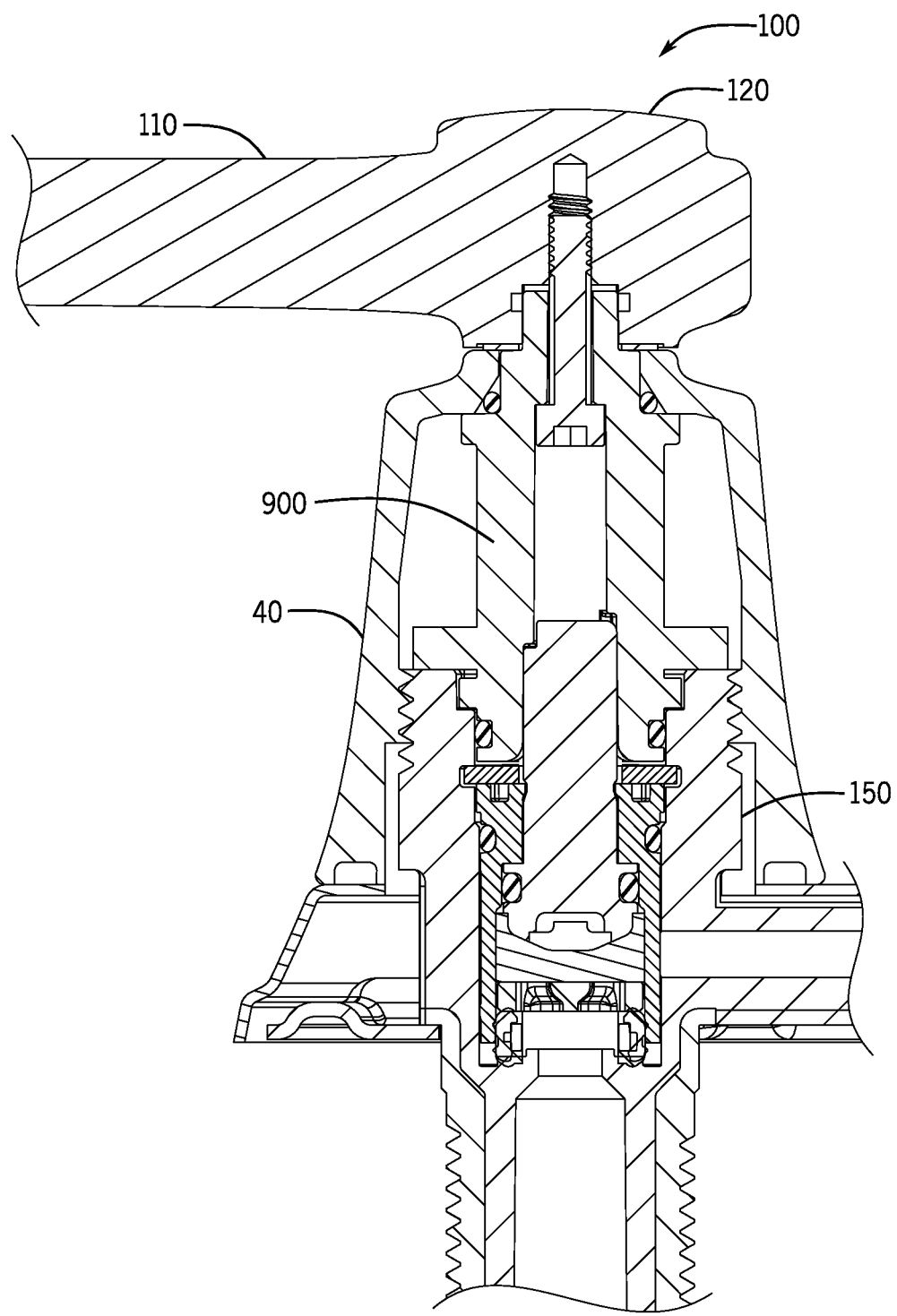
FIG. 9 is a cross-sectional view of a handle assembly, according to an exemplary embodiment of the present disclosure.
Figure 10:
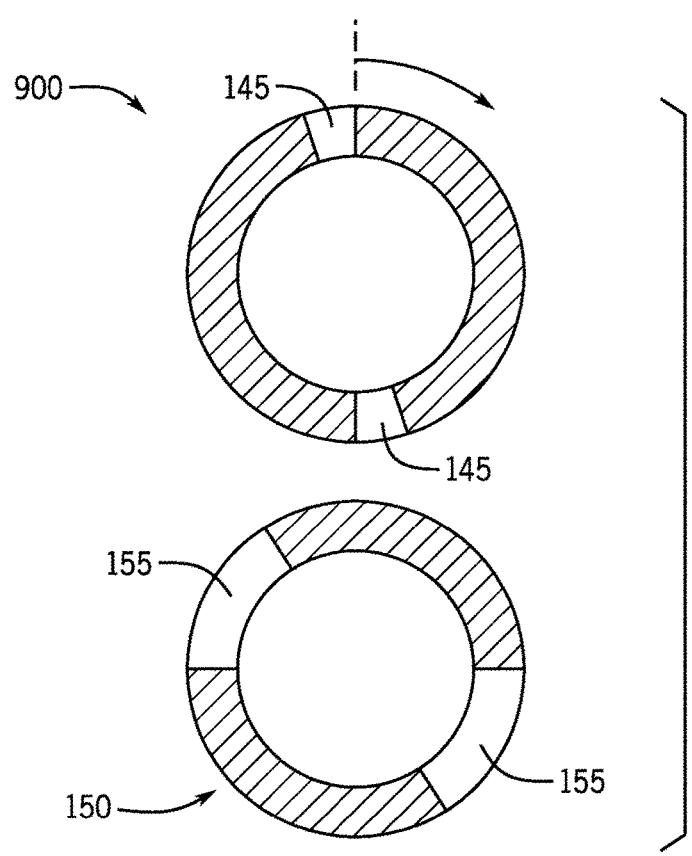
FIG. 10 is a top view of a modified handle adaptor including modified handle adaptor mating teeth, and a modified yoke including modified yoke receiving channels, according to an exemplary embodiment of the present disclosure.

Referring to FIGS. 9-10, handle assembly 100 may include handle 110, a post 120, bonnet 40, a flanged handle adaptor 900, and a modified yoke 150. According to an exemplary embodiment, flanged handle adaptor 900 includes a plurality of teeth (e.g., tabs, protuberances, protrusions, etc.) which engage (e.g., interface, lock, etc.) within a receiving channel within the modified yoke 150 to couple the flanged handle adaptor 900 to modified yoke 150. According to the exemplary embodiment shown in FIG. 10, the interface between flanged handle adaptor 900 and modified yoke 150 is shown. Flanged handle adaptor 900 may include one, two, three, or more flanged handle adaptor mating teeth 145 and modified yoke 150 may include any number of modified yoke receiving channels 155 configured to interface with flanged handle adaptor mating teeth 145. According to an exemplary embodiment, flanged handle adaptor 900 includes two flanged handle adaptor mating teeth 145 and modified yoke 150 includes two modified yoke receiving channels 155. The angular travel of flanged adaptor mating teeth 145 within modified yoke receiving channels 155 may be any suitable distance and may be modified for specific applications. For example, modified yoke receiving channels 155 may be substantially sloped such that flanged adaptor mating teeth 145 are provided increased resistance throughout the angular travel of flanged adaptor mating teeth 145 within modified yoke receiving channels 155. Modified yoke receiving channels 155 may optionally include detents or other suitable locking mechanisms such that angular travel of flanged adaptor mating teeth 145 is resisted or prohibited once a specified angular travel has been obtained. Modified yoke receiving channels 155 and/or flanged adaptor mating teeth 145 may optionally include lubricant or other additive to modify the interface between flanged handle adaptor 900 and modified yoke 150. The user may articulate flanged handle adaptor 900 within modified yoke 150 through a simple twist (e.g., spin, turn, etc.) interface in order to articulate a desired valve of the faucet assembly. According to an exemplary embodiment, modified yoke receiving channel 155 is angularly sized to ninety degrees such that the "on" and "off" positions of the valve can be reached. The angular sizing of modified yoke receiving channels 155 is the maximum allowable amount of rotation that flanged handle adaptor 900 may experience within modified yoke 150. In other words, the extreme ends of the modified yoke receiving channels 155 define the end points of rotation of the flanged handle adapter 900. The angular sizing of modified yoke receiving channels 155 may be increased or decreased depending on specific application needs.

Figure 11:
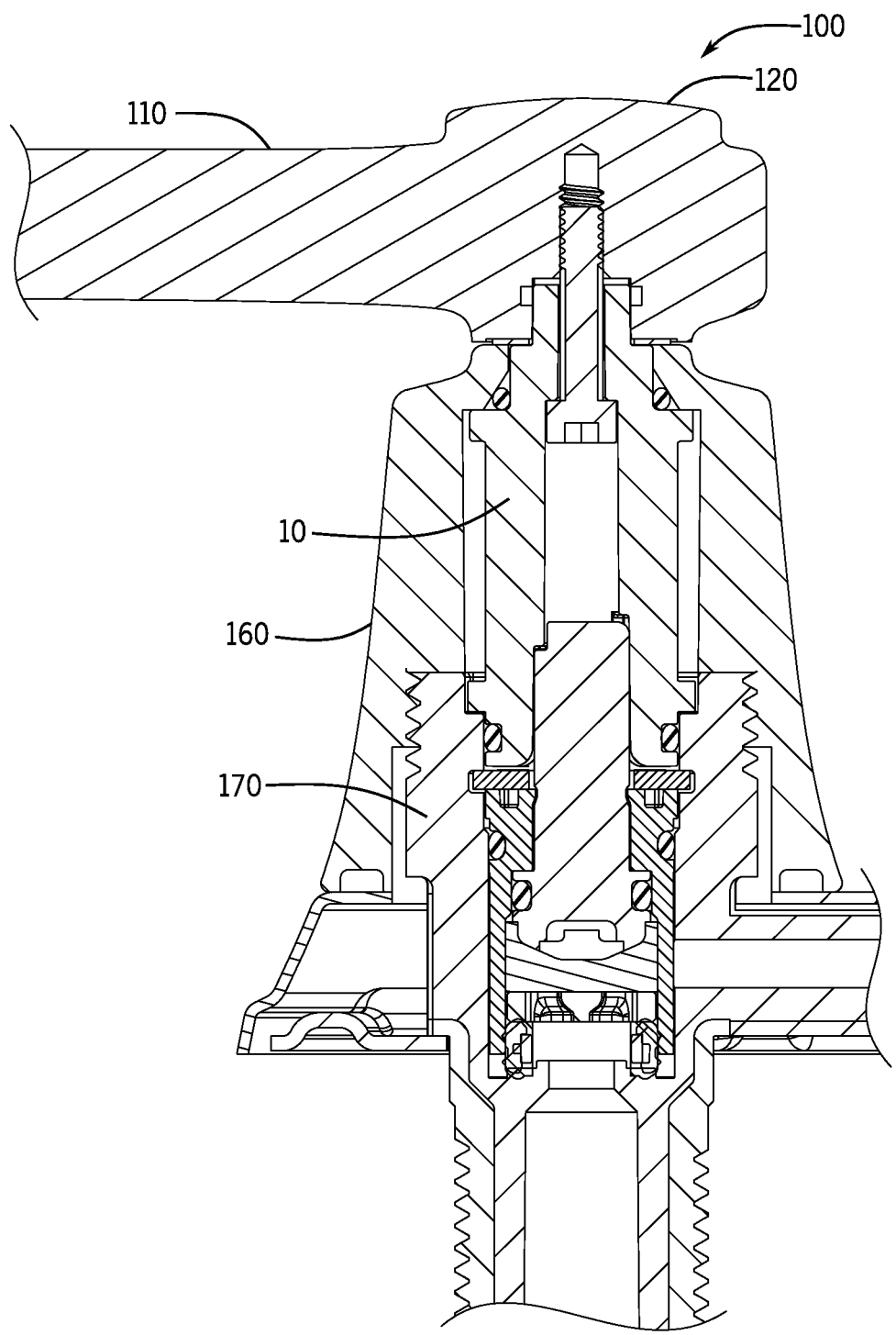
FIG. 11 is a cross-sectional view of a handle assembly, according to another exemplary embodiment of the present disclosure.
Figure 12:
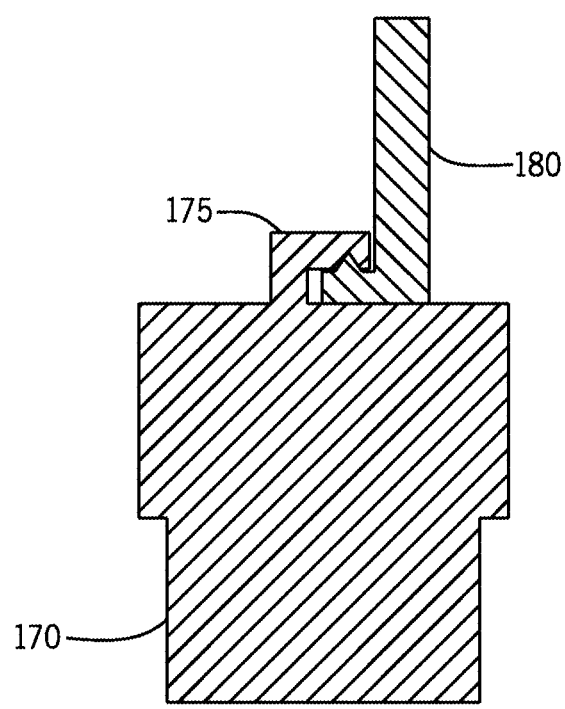
FIG. 12 is a structural diagram of the interface between a retaining clip of a modified yoke and a bonnet prong of a modified bonnet, according to an exemplary embodiment of the present disclosure.

Referring to FIGS. 11-12, handle assembly 100 may include handle 110, post 120, handle adaptor 10, a modified bonnet 160, and a modified retaining yoke 170. According to the exemplary embodiment shown, modified bonnet 160 includes a bonnet prong 180 and modified retaining yoke 170 may include retaining arm 175. The bonnet prong 180 may extend radially outward from a side wall of the modified bonnet 160, and may include a protrusion (e.g., nub, knurl, bump, etc.) that can be received within an opening defined by the retaining arm 175. The protrusion extending from the bonnet prong 180 can create an interference condition with a portion of the retaining arm 175, such that movement of the modified bonnet 160 is limited axially relative to the modified retaining yoke 170. In this manner, the interaction between bonnet prongs 180 and retaining arms 175 can couple modified bonnet 160 to modified retaining yoke 170. Modified bonnet 160 may include any number of bonnet prongs 180, and modified retaining yoke 170 may include any corresponding number of retaining arms 175. Bonnet prongs 180 and retaining arms 175 may be angularly spaced at any suitable angular spacing. According to an exemplary embodiment, modified bonnet includes 160 includes two bonnet prongs 180 spaced one-hundred and eighty degrees apart (i.e., diametrically opposed), and modified retaining yoke 170 includes two retaining arms 175 spaced one-hundred and eighty degrees apart (i.e., diametrically opposed). Bonnet prongs 180 and retaining arms 175 may be of any suitable shape, size, and configuration desirable for the particular application.

Figure 13:
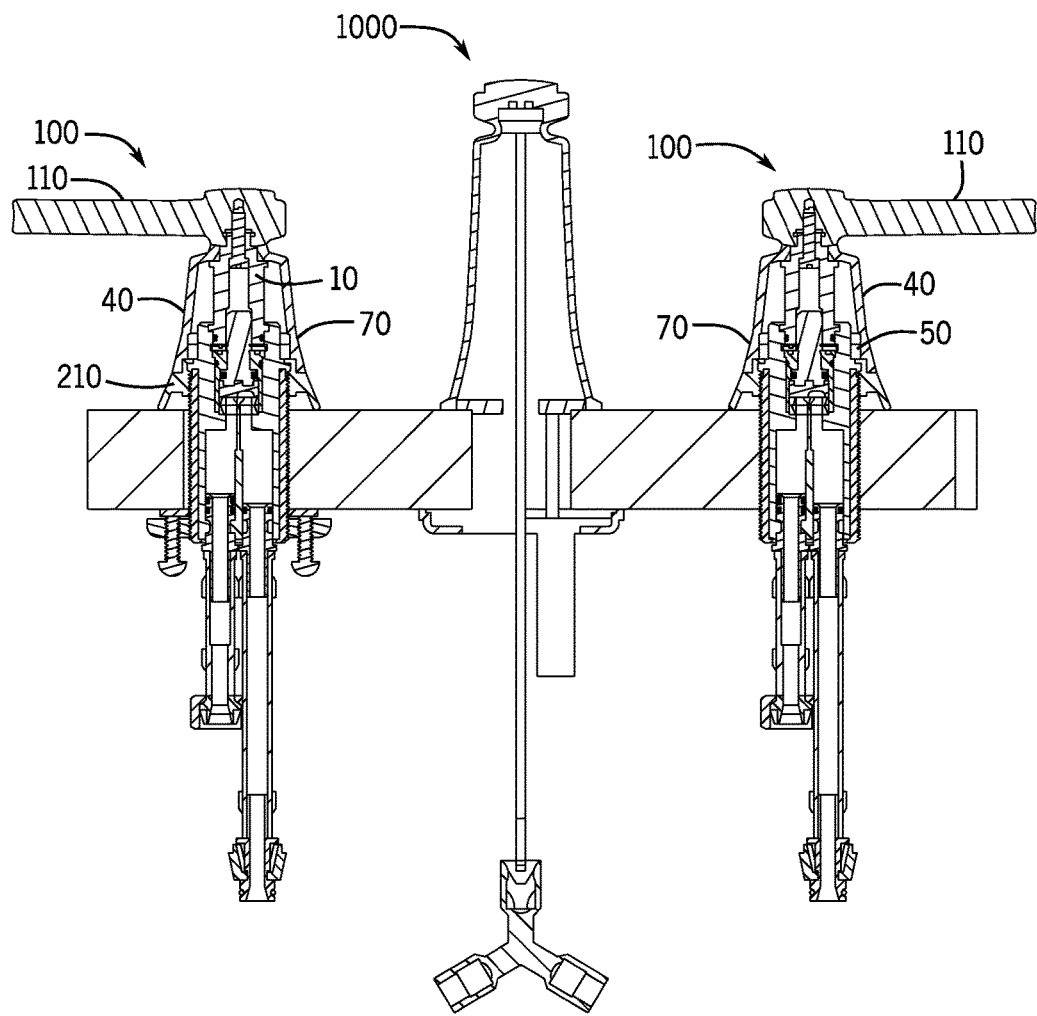
FIG. 13 is a cross-sectional view of a faucet assembly including two handle assemblies individually mounted to independent yokes, according to an exemplary embodiment of the present disclosure.
Figure 14:
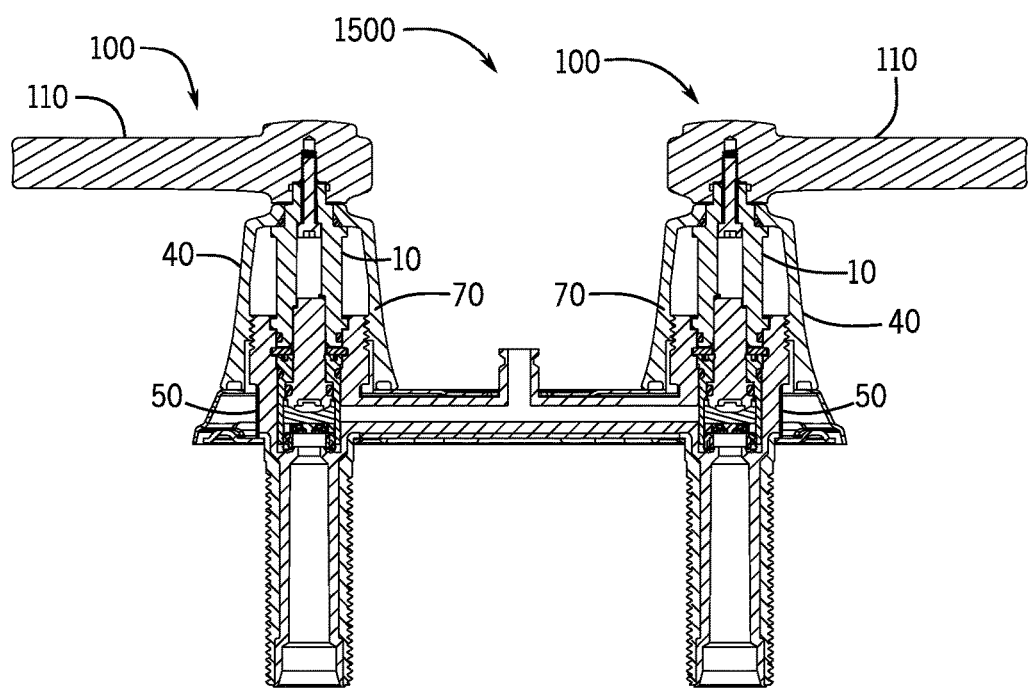
FIG. 14 is a cross-sectional view of another faucet assembly including two handle assemblies, according to another exemplary embodiment of the present disclosure.

Referring to FIGS. 13-14, various faucet assemblies are shown. FIG. 13 illustrates a widespread faucet assembly 1000 including two handle assemblies 100 each including handle 110, handle adaptor 10, bonnet 40, inner ring 70 and an individual yoke 210. FIG. 14 illustrates a centerset faucet assembly 1500 including two handle assemblies 100 each including handle 110, handle adaptor 10, bonnet 40, inner ring 70, and yoke 50. In the embodiments shown in FIGS. 13-14, handle assemblies 100 are coupled (e.g., snapped, connected, etc.) to individual yoke 210 and yoke 50, respectively, through the use of inner ring 70. Handle assembly 100 may be utilized in both the centerset or widespread faucet design, thereby decreasing manufacturing time and cost by eliminating the need for multiple different handle assemblies.

According to various embodiments, handle adapter 10, end stops 20, end stop receiving channels 60, yoke 50, bonnet 40, snap profile 90, inner ring 70, locking features 80, profiled post 120, threaded post 135, locking threads 130, flanged handle adaptor 900, modified yoke 150, modified handle adaptor mating teeth 145, modified yoke receiving channels 155, modified bonnet 160, modified retaining yoke 170, retaining clips 175, bonnet prongs 180, and individual yoke 210 and all other faucet assembly components are constructed of any suitable plastic, thermoset, polymeric based blend, polymer, nylon, rubber, synthetic rubber, polyvinyl chloride, polystyrene, metallic blend, zinc, alloy, brass, aluminum, steel, or any other suitable material. According to various embodiments, various components are constructed of varying materials. For example, in some embodiments, handle adaptor 10 and end stops 20 are constructed of a rubber blend, while bonnet 40 may be constructed of a metallic alloy and yoke 50 may be constructed from a plastic compound.

One embodiment of the present disclosure relates to a handle assembly for a faucet. The handle assembly may include a handle and a handle adaptor. The handle adaptor may be configured to be disposed within a faucet body. The handle adaptor may be further configured to removably couple the handle to a valve stem. The handle adaptor may be further configured to limit the rotational movement of the handle. The handle adaptor may include a protrusion configured to engage an interior portion of the faucet body to thereby establish end points for rotational movement of the valve stem. The handle adaptor may be configured to include an o-ring. The o-ring may be configured to engage the faucet body to thereby create torsional resistance when the handle is rotated.

Another embodiment of the present disclosure relates to a handle assembly for a faucet. The handle assembly may include a handle and a handle adaptor. The handle adaptor may be configured to be disposed within a faucet body. The handle adaptor may be further configured to removably couple the handle to a valve stem. The handle adaptor may be further configured to limit the rotational movement of the handle. The handle adaptor may include a number of end stops configured to engage a corresponding number of end stop receiving channels disposed on the interior portion of the faucet body to thereby establish end points for rotational movement of the valve stem. The number of end stops may be two. The end stops may be substantially rectangular shaped.

Yet another embodiment of the present disclosure relates to a handle assembly for a faucet. The handle assembly may include a handle and a handle adaptor. The handle adaptor may be configured to be disposed within a faucet body. The handle adaptor may be further configured to removably couple the handle to a valve stem. The handle adaptor may be further configured to limit the rotational movement of the handle. The handle adaptor may include a number of end stops configured to engage a corresponding number of end stop receiving channels disposed on the interior portion of the faucet body to thereby establish end points for rotational movement of the valve stem. The number of end stops may be two. The end stops may be substantially rectangular shaped. The handle adaptor may include a torsion ring positioned at a portion of the handle adapter proximate the valve assembly. The torsion ring may be configured to provide a torsional resistance to rotation of the handle. The torsional resistance of the torsion ring may be adjusted by changing physical parameters of the torsion ring. The physical parameters may be overall diameter, shape, material, and thickness.

Yet another embodiment of the present disclosure relates to a handle assembly for a faucet. The handle assembly may include a handle and a handle adaptor. The handle adaptor may be configured to be disposed within a faucet body. The handle adaptor may be further configured to removably couple the handle to a valve stem. The handle adaptor may be further configured to limit the rotational movement of the handle. The handle adaptor may include a protrusion configured to engage an interior portion of the faucet body to thereby establish end points for rotational movement of the valve stem. The handle adaptor may include a torsion ring positioned at a portion of the handle adapter proximate the valve assembly. The torsion ring may be configured to provide a torsional resistance to rotation of the handle. The torsional resistance of the torsion ring may be adjusted by changing physical parameters of the torsion ring. The physical parameters may be overall diameter, shape, material, and thickness.

Yet another embodiment of the present disclosure related to a handle assembly for a faucet. The handle assembly may include a handle, a bonnet, a yoke, and a handle adaptor. The handle adaptor may be configured to be disposed within a faucet body. The handle adaptor may be further configured to removably couple the handle to a valve stem. The handle adaptor may be further configured to limit the rotational movement of the handle. The handle adaptor may include a protrusion configured to engage an interior portion of the faucet body to thereby establish end points for rotational movement of the valve stem. The bonnet may include an inner ring and a number of locking features. The yoke may include a snap profile. The yoke may be coupled to the handle assembly. The bonnet may be coupled to the yoke through the insertion of the locking features into the snap profile. The insertion of the locking features into the snap profile may take the form of a turn and snap assembly sequence.

Yet another embodiment of the present disclosure related to a handle assembly for a faucet. The handle assembly may include a handle, a bonnet, a yoke, and a handle adaptor. The handle adaptor may be configured to be disposed within a faucet body. The handle adaptor may be further configured to removably couple the handle to a valve stem. The handle adaptor may be further configured to limit the rotational movement of the handle. The handle adaptor may include a protrusion configured to engage an interior portion of the faucet body to thereby establish end points for rotational movement of the valve stem. The bonnet may include an inner ring and a number of locking features. The yoke may include a snap profile. The yoke may be coupled to the handle assembly. The bonnet may be coupled to the yoke through the insertion of the locking features into the snap profile. The insertion of the locking features into the snap profile may take the form of a turn and snap assembly sequence. The handle adaptor may include a torsion ring positioned at a portion of the handle adapter proximate the valve assembly. The torsion ring may be configured to provide a torsional resistance to rotation of the handle between the yoke and the handle adaptor. The torsional resistance of the torsion ring may be adjusted by changing physical parameters of the torsion ring. The physical parameters may be overall diameter, shape, material, and thickness.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or resequenced according to alternative embodiments. Other substitutions, modifications, changes and omissions may also be made in the design, operating conditions and arrangement of the various exemplary embodiments without departing from the scope of the present application.

What is claimed is:

1. A faucet handle assembly, comprising:
   a faucet handle;
   a handle adaptor having a plurality of end stops extending radially outward therefrom, wherein the handle adaptor is configured to:
      rotatably couple the faucet handle to a fluid control valve disposed within a valve body, and
      rotatably couple to the valve body by the plurality of end stops; and
   a bonnet including an inner ring having a plurality of locking features, wherein the bonnet is configured to be removably coupled to the valve body by the plurality of locking features.

2. The faucet handle assembly of claim 1, wherein the handle adaptor further comprises a torsion ring disposed around the handle adaptor, wherein the handle adaptor is configured to rotate relative to the valve body and the torsion ring is configured to engage the valve body to provide frictional resistance therebetween.

3. The faucet handle assembly of claim 2, wherein the torsion ring is an o-ring received within a groove of the handle adaptor.

4. The faucet handle assembly of claim 1, wherein the plurality of end stops includes two end stops that are diametrically opposed relative to each other, and wherein the two end stops are coplanar with each other.

5. The faucet handle assembly of claim 1, wherein the inner ring of the bonnet extends radially inward toward a center of the bonnet, and wherein the plurality of locking features extend radially further inward toward the center of the bonnet from the inner ring.

6. The faucet handle assembly of claim 5, wherein the plurality of locking features are configured to engage with a snap profile on the valve body to removably couple the bonnet to the valve body.

7. The faucet handle assembly of claim 1, wherein the handle further comprises a post extending therefrom, wherein the post is configured to be inserted into the handle adaptor to couple the handle to the handle adaptor.

8. The faucet handle assembly of claim 7, wherein the post has a tapered profile, and wherein the post is configured to have an interference fit with the handle adaptor.

9. The faucet handle assembly of claim 7, wherein the post includes locking threads configured to cut into an inner wall of the handle adaptor.

10. A faucet handle assembly, comprising:
    a faucet handle;
    a handle adaptor coupled to the handle, wherein the handle adaptor includes a plurality of end stops extending radially outward therefrom and a torsion ring disposed around the handle adaptor, wherein the handle adaptor is configured to:
       rotatably couple the faucet handle to a fluid control valve disposed within a valve body, and
       rotatably couple to the valve body by the plurality of end stops; and
    a bonnet including an inner ring having a plurality of locking features, wherein the bonnet is configured to be removably coupled to the valve body by the plurality of locking features; and
    wherein the handle and the handle adaptor are configured to rotate relative to the valve body and the torsion ring is configured to engage the valve body to provide frictional resistance therebetween.

11. The faucet handle assembly of claim 10, wherein the torsion ring is an o-ring received within a groove of the handle adaptor.

12. The faucet handle assembly of claim 10, wherein the plurality of end stops includes two end stops that are diametrically opposed relative to each other, and wherein the two end stops are coplanar with each other.

13. The faucet handle assembly of claim 10, wherein the inner ring of the bonnet extends radially inward toward a center of the bonnet, and wherein the plurality of locking features extend radially further inward toward the center of the bonnet from the inner ring.

14. The faucet handle assembly of claim 13, wherein the plurality of locking features are configured to engage with a snap profile on the valve body to removably couple the bonnet to the valve body.

15. The faucet handle assembly of claim 10, wherein the handle further comprises a post extending therefrom, wherein the post is configured to be inserted into the handle adaptor to couple the handle to the handle adaptor.

16. The faucet handle assembly of claim 15, wherein the post has a tapered profile, and wherein the post is configured to have an interference fit with the handle adaptor.

17. The faucet handle assembly of claim 15, wherein the post includes locking threads configured to cut into an inner wall of the handle adaptor.

18. A faucet handle assembly, comprising:
a faucet handle;
a handle adaptor coupled to the faucet handle and configured to:
  rotatably couple the faucet handle to a fluid control valve disposed within a valve body, and
  rotatably couple to the valve body; and
a bonnet including an inner ring having a plurality of locking features, wherein the bonnet is configured to be removably coupled to the valve body by the plurality of locking features, and wherein the inner ring of the bonnet extends radially inward toward a center of the bonnet, and wherein the plurality of locking features extend radially further inward toward the center of the bonnet from the inner ring.

19. The faucet handle assembly of claim 18, wherein the plurality of locking features are configured to engage with a snap profile on the valve body to removably couple the bonnet to the valve body.

20. The faucet handle assembly of claim 18, wherein the handle adaptor further comprises a torsion ring disposed around the handle adaptor, wherein the handle adaptor is configured to rotate relative to the valve body and the torsion ring is configured to engage the valve body to provide frictional resistance therebetween.

* * * * *